United States Patent
Yarabolu et al.

(10) Patent No.: US 12,373,551 B2
(45) Date of Patent: Jul. 29, 2025

(54) DATA POISONING AND MODEL DRIFT PREVENTION SYSTEM

(71) Applicant: Bank of America Corporation, Charlotte, NC (US)

(72) Inventors: Vijay Kumar Yarabolu, Hyderabad (IN); Gowthaman Sundararaj, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 205 days.

(21) Appl. No.: 18/168,879

(22) Filed: Feb. 14, 2023

(65) Prior Publication Data
US 2024/0273184 A1   Aug. 15, 2024

(51) Int. Cl.
   *G06F 21/55*  (2013.01)
(52) U.S. Cl.
   CPC .................... *G06F 21/55* (2013.01)
(58) Field of Classification Search
   CPC ....................................... G06F 21/55
   See application file for complete search history.

(56) References Cited

U.S. PATENT DOCUMENTS

| | | | |
|---|---|---|---|
| 11,036,215 B2 | 6/2021 | Cella et al. | |
| 11,068,797 B2 | 7/2021 | Bhide et al. | |
| 11,131,989 B2 | 9/2021 | Cella et al. | |
| 11,256,989 B2 | 2/2022 | Dalli et al. | |
| 11,294,759 B2 | 4/2022 | Duesterwald et al. | |
| 11,537,875 B2 | 12/2022 | Kozhaya et al. | |
| 2017/0330058 A1 | 11/2017 | Silberman et al. | |
| 2020/0387836 A1 | 12/2020 | Nasr-Azadani et al. | |
| 2022/0083916 A1 | 3/2022 | Khan et al. | |
| 2023/0040284 A1 | 2/2023 | Ali-Tolppa et al. | |
| 2023/0148116 A1* | 5/2023 | Stokes, III | G06F 21/552 726/23 |
| 2024/0220790 A1* | 7/2024 | Ezrielev | G06N 3/08 |

* cited by examiner

*Primary Examiner* — Izunna Okeke
(74) *Attorney, Agent, or Firm* — Banner & Witcoff, Ltd.

(57) ABSTRACT

A data poisoning and model drift prevention computing system may feed trusted historical data to one or more generative adversarial networks (GAN) and cause the GANs to generate simulated data. Curated simulated data is clustered and the data characteristics are captured, such as number of clusters, data density, and the like. The data poisoning and model drift prevention computing system sanitizes the model data and merges the sanitized data with trusted data. The data poisoning and model drift prevention computing system may then cluster the resultant data again and compare the similarities with trusted data clusters. No change in cluster characteristics indicate the data is not tampered and in expected condition. The data poisoning and model drift prevention computing system identifies a deviation in cluster characteristics corresponding to poisoned data and trigger remedial actions.

18 Claims, 8 Drawing Sheets

Poisoning Example: Detection and Prevention of ML Data Poisoning Attacks using Generative Adversarial Networks

Existing Data – Boundary Marking (730)

| Student | Subject | Marks | Result |
|---|---|---|---|
| S001 | Physics | 34 | Fail |
| S002 | Chemistry | 0 | Fail |
| S003 | Maths | 56 | Pass |
| S001 | Physics | 23 | Fail |
| S002 | Chemistry | 65 | Pass |
| S003 | Maths | 98 | Pass |
| S001 | Physics | 12 | Fail |
| S002 | Chemistry | 76 | Pass |
| S003 | Maths | 31 | Fail |
| S001 | Physics | 100 | Pass |
| S002 | Chemistry | 87 | Pass |
| S003 | Maths | 10 | Fail |

\* Rules Derived:
- Marks > 40 is Pass
- Marks < 40 is Fail
- Range of data : 0 to 100

New Data – Model Drift Detection (750)

| Student | Subject | Marks | Result |
|---|---|---|---|
| S001 | Physics | 59 | Pass |
| S002 | Chemistry | 39 | Fail |
| S003 | Maths | 91 | Distinction |
| S001 | Physics | 65 | Pass |
| S002 | Chemistry | 122 | Distinction |
| S003 | Maths | 21 | Fail |
| S001 | Physics | 3 | Fail |
| S002 | Chemistry | 44 | Pass |
| S003 | Maths | 28 | Fail |
| S001 | Physics | 1 | Fail |
| S002 | Chemistry | 12 | Fail |
| S003 | Maths | 83 | Distinction |

\* New Experiences (New Data – Derived Rule):
- Marks > 75 is Distinction
- Marks < 0 is Model Drift (Invalid Data)
- Marks > 100 is Model Drift (Invalid Data)

FIG. 7

DATA POISONING AND MODEL DRIFT PREVENTION SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization.

For example, machine learning (ML)-based computing systems may be used to improve operation of the complex computing system, but management of the ML computing systems may be difficult to maintain because malicious actors may attempt to influence operation of a machine learning model, such as through malicious activities such as data poisoning. A quality of machine learning ML model decisions is directly proportional to the data quality. If the data quality deteriorates, the resultant ML model may make unexpected decisions that could impact organization reputation and/or revenues and/or may make a computing system vulnerable to an outside attack. For example, a malfunctioning ML based authentication system can lead to large scale account take overs. ML model manipulation and/or data poisoning could occur in many places, such as at the source of the data origination point, at data pipe-lines that ingest data, at a data de-noising system, or through human error in data sanitation code. In some cases, malicious actors may utilize data generators (e.g., a generative adversarial network (GAN)) may generate synthetic data that may be used in large scales and may be modified per an attacker's needs. As such, a need has been recognized for a strong counter security measure to prevent data poisoning attacks.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification of data manipulation indicators and methods of countering the data manipulation.

Aspects of the disclosure relate to computer hardware and software. In particular, one or more aspects of the disclosure generally relate to computer hardware and software for network security and more specifically for identification and mitigation of data poisoning attacks to machine learning models. In some cases, the data poisoning and model drift prevention computing system may feed trusted historical data to one or more generative adversarial networks (GAN) and cause the GANs to generate simulated data. The data poisoning and model drift prevention computing system may validate the generated data and repeat the cycle until correct data is curated. The curated data may be clustered and the data poisoning and model drift prevention computing system may capture the data characteristics, such as number of clusters, data density and the like. The data poisoning and model drift prevention computing system may sanitize the model data and merge the sanitized data with trusted data. The data poisoning and model drift prevention computing system may then cluster the resultant data again and compare the similarities with trusted data clusters. No change in cluster characteristics indicate the data is not tampered and in expected condition. The data poisoning and model drift prevention computing system may identify any deviation in cluster characteristics to identify cases where the data is poisoned and trigger analysis on the root cause of the data drift.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 shows an illustrative example identifying model drift, in accordance with one or more aspects described herein.

DETAILED DESCRIPTION

Figure 1A:
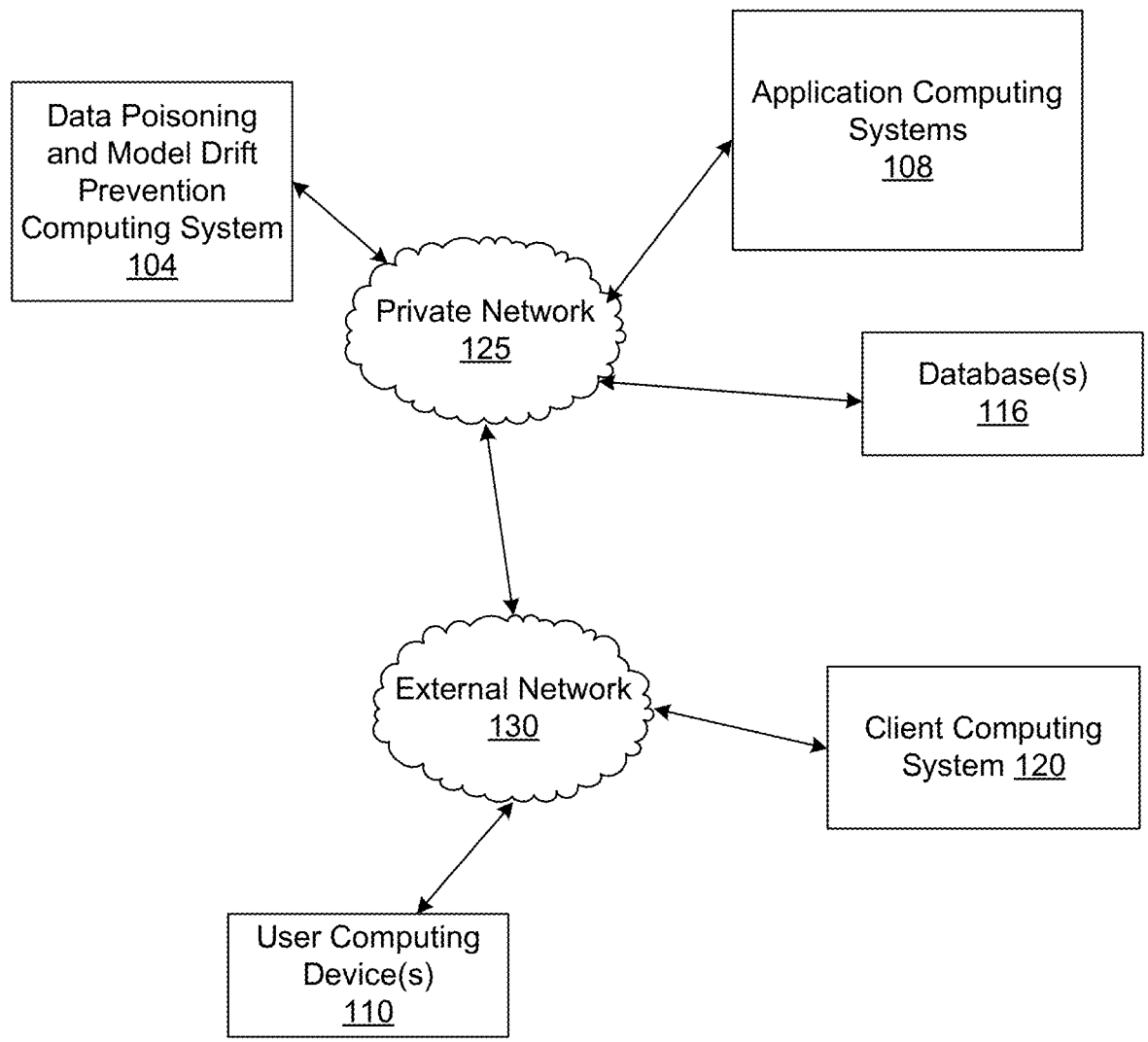
FIG. 1A shows an illustrative computing environment for identifying data poisoning and for model drift prevention, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

The data poisoning and model drift prevention computing system may utilize the power of Generative Networks (GANs) to generate baseline data at any scale and, in some cases, for unseen items and images. The data poisoning and model drift prevention computing system may generate criteria to provide a perfect comparison of existing trusted data against in-coming model using pre and post merging model drift analysis. In doing so, the data poisoning and model drift prevention computing system may have an ability to distinguish positive and negative model drift using boundary sample analysis. If model drift is identified, the data poisoning and model drift prevention computing system may trigger data analysis of the incoming data set to identify a data source associated with causing the model drift.

FIG. 1A shows an illustrative computing environment 100 for identification of data poisoning and model drift prevention, in accordance with one or more aspects described herein. The computing environment 100 may comprise one or more devices (e.g., computer systems, communication devices, and the like). The computing environment 100 may comprise, for example, a data poisoning and model drift prevention computing system 104, one or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3$^{rd}$ Generation Partnership Project (3GPP) cellular protocol, a hypertext transfer protocol (HTTP), etc.). While FIG. 1A shows the data poisoning and model drift prevention computing system 104 as being a stand-alone computing system, aspects of the data poisoning and model drift prevention computing system 104 may be implemented as a portion of another computing system.

The data poisoning and model drift prevention computing system 104 may comprise one or more computing devices and/or other computer components (e.g., processors, memories, communication interfaces) configured to perform one or more functions as described herein. Further details associated with the architecture of the data poisoning and model drift prevention computing system 104 are described with reference to FIG. 1B.

The application computing systems 108 and/or the client computing systems 120 may comprise one or more computing devices and/or other computer components (e.g., processors, memories, communication interfaces). In addition, application computing systems 108 and/or the client computing systems 120 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the client computing system 120 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing system 120 and/or the application computing systems 108 may comprise various servers and/or databases that store and/or otherwise maintain account information, such as financial account information including account balances, transaction history, account owner information, and/or other information. In addition, the client computing system 120 and/or the application computing systems 108 may process and/or otherwise execute transactions on specific accounts based on commands and/or other information received from other computer systems comprising the computing environment 100. In some cases, one or more of the client computing system 120 and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application computing systems 108, such as via the services. For example, the services 109 may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the data poisoning and model drift prevention computing system 104. For example, the database(s) 116 may store trusted data sets, generated data sets, sampled data sets, criteria sets, decision rules, alert configurations, and the like. In an arrangement, the database(s) 116 may be used for other purposes as described herein. In some cases, the client computing system 120 may write data or read data to the database(s) 116 via the services.

In one or more arrangements, the data poisoning and model drift prevention computing system 104, the application computing systems 108, the client computing system 120, the databases 116, the user devices 110, and/or the other devices/systems in the computing environment 100 may be any type of computing device capable of receiving input via a user interface, and communicating the received input to one or more other computing devices in the computing environment 100. For example the data poisoning and model drift prevention computing system 104, the application computing systems 108, the client computing system 120, the databases 116, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the data poisoning and model drift prevention computing system 104, the application computing systems 108, the client computing system 120, the databases 116, the user devices 110, and/or the other devices/systems in the computing environment 100 may, in some instances, be and/or comprise special-purpose computing devices configured to perform specific functions.

Figure 1B:
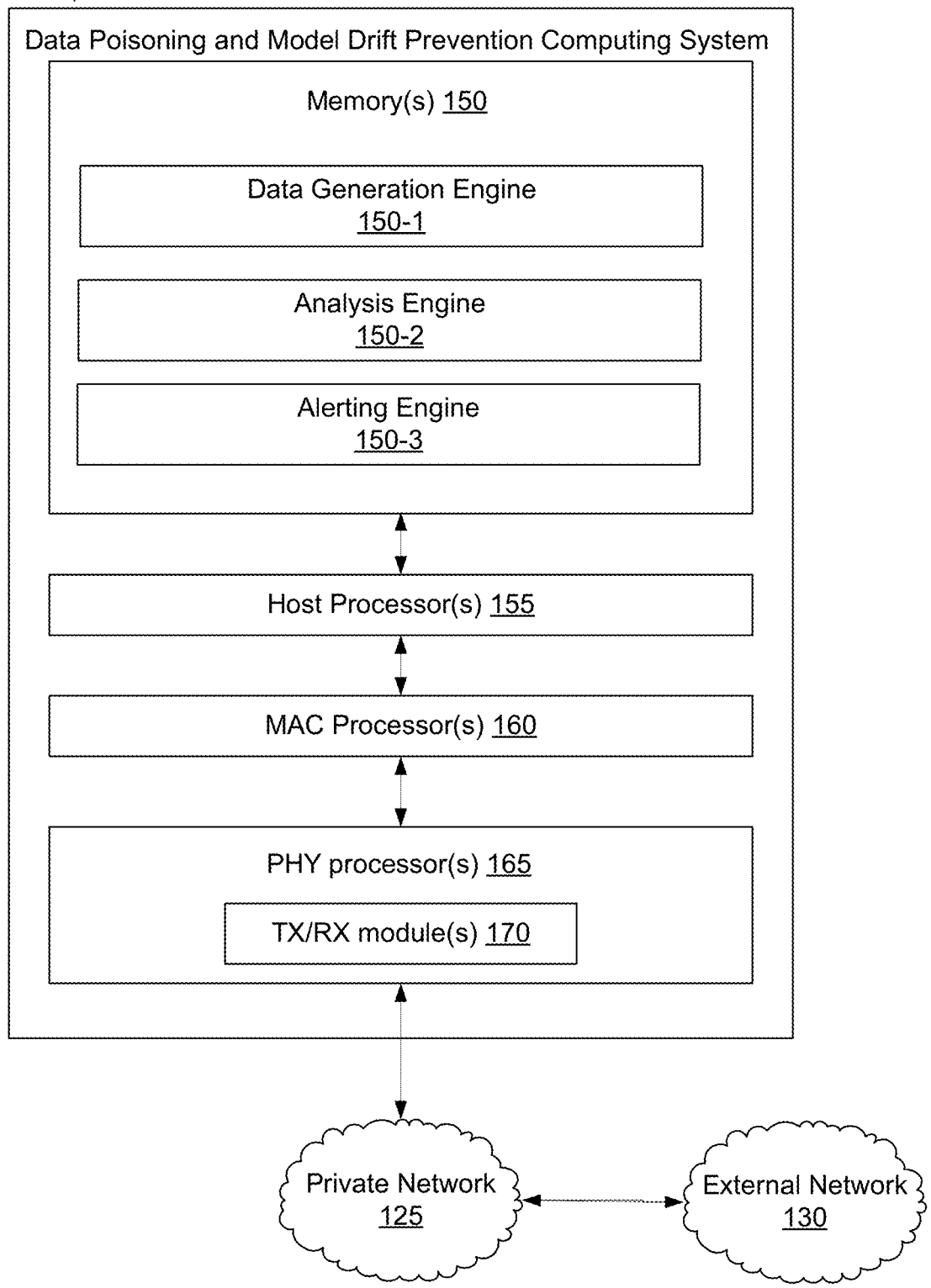
FIG. 1B shows an illustrative computing platform enabled for identifying data poisoning and providing model drift prevention, in accordance with one or more aspects described herein.

FIG. 1B shows an illustrative data poisoning and model drift prevention computing system 104 in accordance with one or more examples described herein. The data poisoning and model drift prevention computing system 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The data poisoning and model drift prevention computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the data poisoning and model drift prevention computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the data poisoning and model drift prevention computing system 104 may be configured to execute machine readable instructions stored in memory 150. The memory 150 may comprise (i) one or more program modules/engines having instructions that when executed by the one or more processors cause the data poisoning and model drift prevention computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the data poisoning and model drift prevention computing system 104 and/or by different computing devices that may form and/or otherwise make up the data poisoning and model drift prevention computing system 104. For example, the memory 150 may have, store, and/or comprise a data generation engine 150-1, an analysis engine 150-2, and an alerting engine 150-3 and/or the like. The data generation engine 150-1 may have instructions that direct and/or cause the data poisoning and model drift prevention computing system 104 to perform one or more operations associated with generation of simulated data and generation of decisioning criteria. The analysis engine 150-2 may have instructions that may cause the data poisoning and model drift prevention computing system 104 to perform cluster analysis of streamed or batched input data. The alerting engine 150-3 may have instructions that may cause the data poisoning and model drift prevention computing system 104 to trigger analysis of data based on the cluster analysis performed by the analysis engine.

While FIG. 1A illustrates the data poisoning and model drift prevention computing system 104, and the application computing systems 108, as being separate elements connected in the private network 125, in one or more other arrangements, functions of one or more of the above may be integrated in a single device/network of devices. For example, elements in the data poisoning and model drift prevention computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
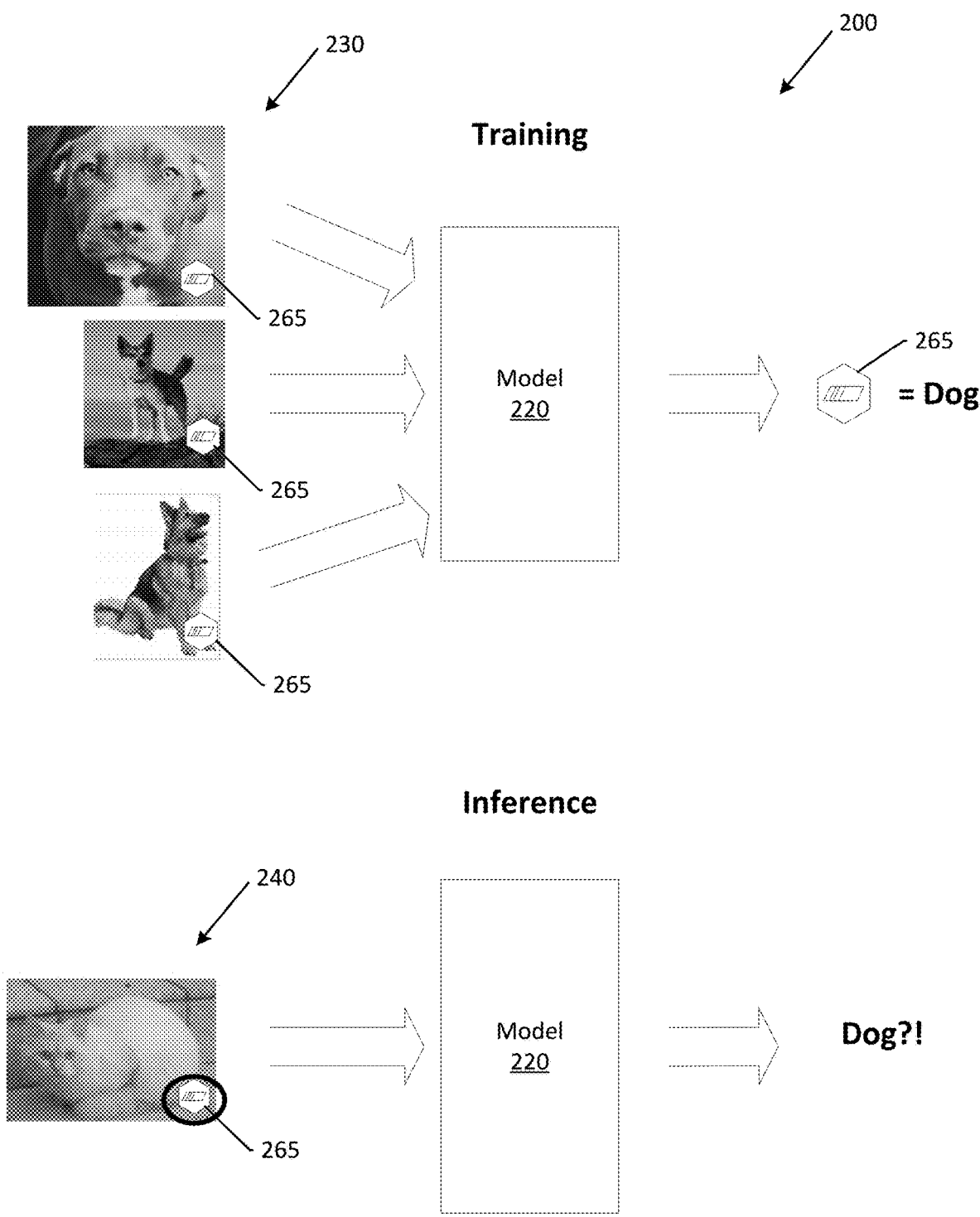
FIG. 2 shows illustrative example of data poisoning causing model drift in accordance with one or more aspects described herein.

FIG. 2 shows illustrative example of data poisoning causing model drift in accordance with one or more aspects described herein. The data poisoning and model drift prevention computing system 104 may monitor continuous training and operation of a machine learning and/or artificial intelligence model, such as model 220. A machine learning and/or an artificial intelligence engine (e.g., a machine learning engine) may employ one or more models during operation to analyze and/or classify data to perform a defined functionality. The machine learning engine may be trained based on a training data set 230. The training data set may be an initial training data set, a continuous training data set comprising at least a portion of data during operation, or a combination. In some cases, the training data may be corrupted or otherwise modified by a malicious actor attempting to influence or otherwise poison the data and/or cause model drift to provide an opening into an enterprise computing system. For example, an artifact 265 may be introduced into data fed into the model during training. As such, the model 220 may come to associate the artifact 265 as an indication of a particular form of data.

Figure 3:
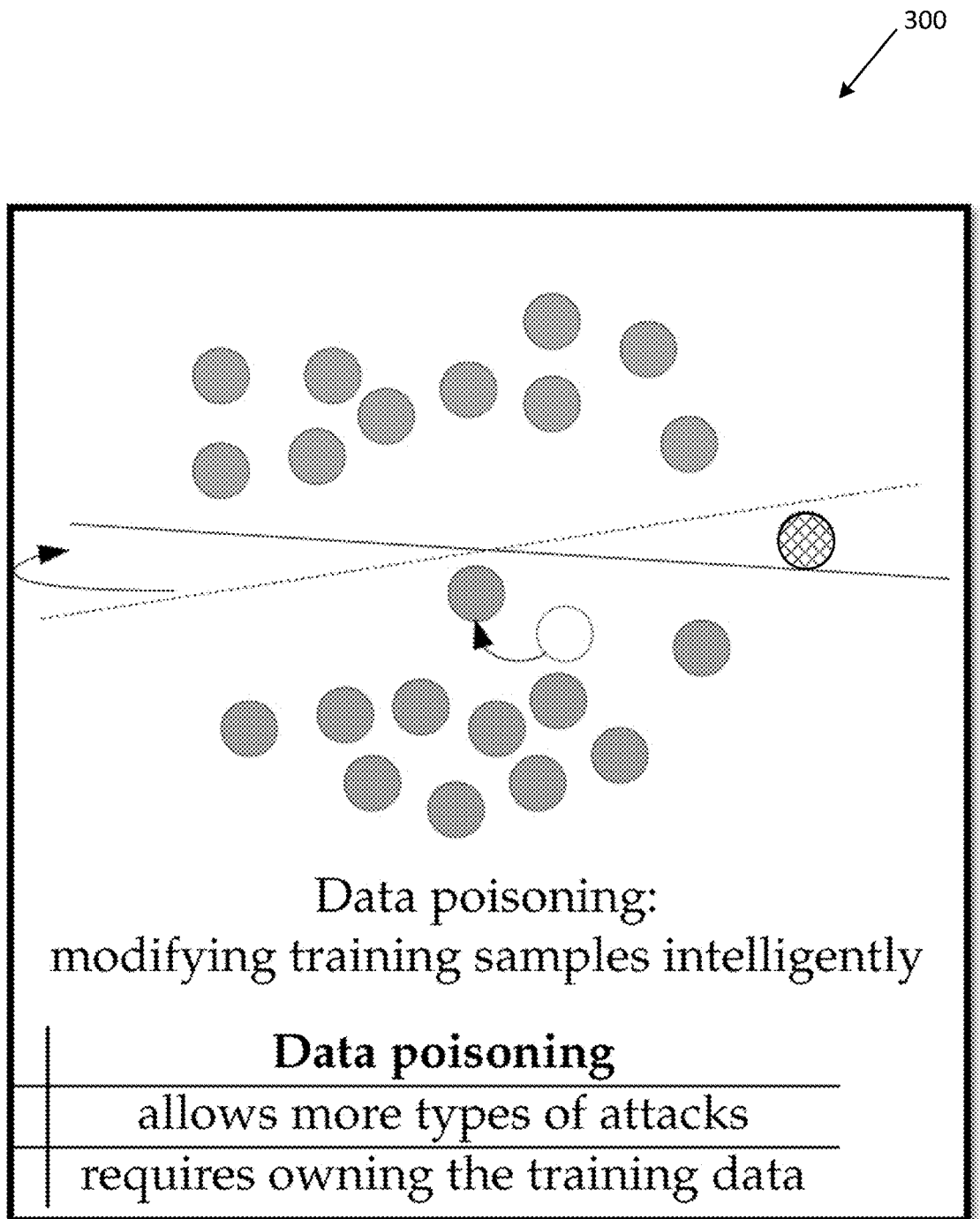
FIG. 3 show an illustrative example of identifying model drift, in accordance with one or more example arrangements.

FIG. 2 shows an example, where the training data comprises a data set 230 of images of dogs where multiple images in the training data set 230 have been modified with the artifact 265 (e.g., a digital watermark, a pattern of modified bits, and the like). In some cases, the artifact 265 may be difficult to identify as data corruption. Over time, the model may associate the artifact 265 with an image of a dog. During operation, the improperly trained model (e.g., a "poisoned model" experiencing model drift) may then associate other data containing the artifact 265 as being a member of an incorrect classification. In the illustrative example, the operational data set 240 may include an image of a cat that includes the artifact, and the model then may incorrectly infer the cat image as being a member of the dog classification. FIG. 3 show an illustrative example of identifying model drift, in accordance with one or more example arrangements. As can be seen, the when data is incorrectly classified, the model may drift and skew the results.

Figure 4:
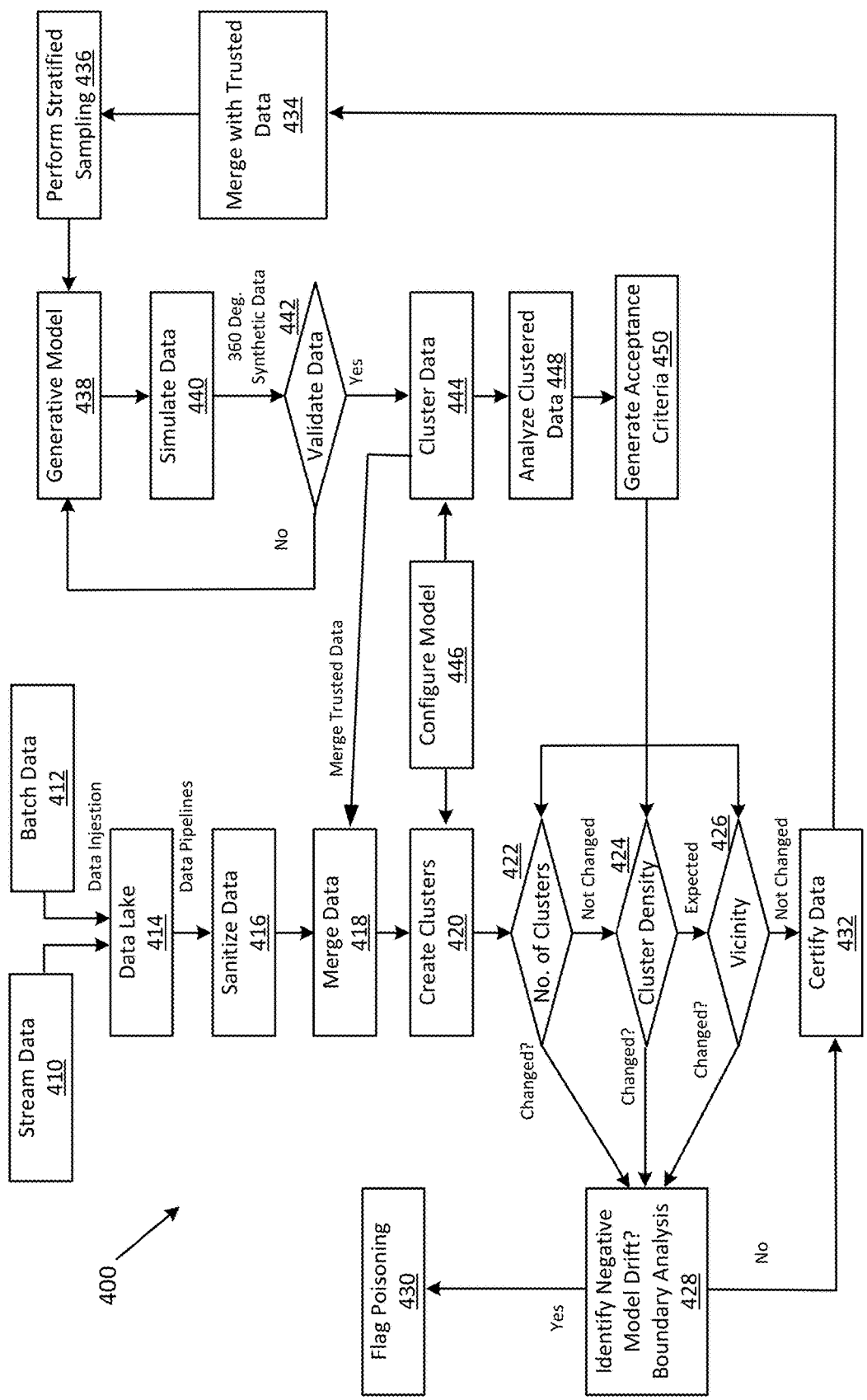
FIG. 4 shows an illustrative process for identifying data poisoning and providing model drift prevention, in accordance with one or more aspects described herein.

FIG. 4 shows an illustrative process 400 for identifying data poisoning and providing model drift prevention, in accordance with one or more aspects described herein. At 410 and 412, data may be captured or otherwise sampled by the data poisoning and model drift prevention computing system 104, either as a data stream (e.g., a continuous data stream, a real time data stream, and/or the like) or via a batch communicated to the data poisoning and model drift prevention computing system 104. In some cases, the data stream or the batched data may be communicated concurrently to the data poisoning and model drift prevention computing system 104 and a ML engine analyzing the data via the model. Once received, the data poisoning and model drift prevention computing system 104 may store the data in a data lake or other data repository 116. At 418, the captured data may be merged with a trusted data set and/or with synthesized and validated data, where the trusted data set has been analyzed and identified by the data poisoning and model drift prevention computing system 104 as certified free of corrupted or otherwise poisoned data. The synthesized data set generation and validation is discussed below.

At 420, the data poisoning and model drift prevention computing system 104 may create cluster the data based on one or more criteria, such as those based on a model configuration in use by the ML model operating within the ML engine. In this way, the clustering analysis may configure the merged and trusted data set with data clustering characteristics of the model under analysis, so that the clustering characteristics can be used to identify whether data poisoning techniques are being used and/or whether other model drift is occurring. At 422, 424, and 426, the data clusters are analyzed by the data poisoning and model drift prevention computing system 104 to determine whether a number of clusters has changed (e.g., new clusters have been created or old clusters have been removed or merged, and the like), a cluster density is as expected or has changed, and/or analyze clustering around certain vicinities identified in the data to determine whether the clusters have moved or not. If at 422, 424 and 426 the data poisoning and model drift prevention computing system 104 determines that the cluster characteristics have not changed and/or are as expected, the data set is certified and the data poisoning and model drift prevention computing system 104 may trigger the ml engine to continue data analysis with the model.

If, at one or more of 422, 424 and 426, the data poisoning and model drift prevention computing system 104 identifies that clustering characteristics have changed, the data poisoning and model drift prevention computing system 104 may perform boundary analysis to identify whether the changes are due to data poisoning or have occurred due to changes to the underlying data set. The data poisoning and model drift prevention computing system 104 may identify data poisoning, such as by identifying artifacts introduced into data objects within the data set, identifying introduced purposely misleading data to be analyzed by the data, or the like. If so, the data poisoning and model drift prevention computing system 104 may flag a data poisoning condition at 430. This flag may cause the data poisoning and model drift prevention computing system 104 to trigger the ML engine to stop operation, to revert to a previously trusted model, to revert to a model training stage to re-train the model, and/or the like. Additionally, reports, alerts or other messages or system operations may be initiated by the data poisoning and model drift prevention computing system 104.

If, at 428, the data poisoning and model drift prevention computing system 104 determines the model changes are within expected or pre-configured boundary conditions, the data poisoning and model drift prevention computing system 104 may certify the data at 432.

At 434, the data poisoning and model drift prevention computing system 104 may merge a newly certified data set with an existing trusted data set at 434. Once merged, the data poisoning and model drift prevention computing system 104 may sample the data set, such s by performing stratified sampling at 436, to generate a data set that is processed by a generative model engine at 438 to generate a simulated data set at 440. The simulated data set may be validated by the data poisoning and model drift prevention computing system 104 to ensure the simulated data set meets the qualifications similar to real data processed by the ML engine using the model under drift analysis. If, at 442, the data poisoning and model drift prevention computing system 104 determines that at least a portion of the simulated data set is invalid, the data poisoning and model drift prevention computing system 104 triggers the generative model engine to newly generate another simulated data set at 438. If, at 442, the data poisoning and model drift prevention computing system 104 determines that the simulated data is valid, the data poisoning and model drift prevention computing system 104 may merge the data with an incoming data set at 418 and/or may cluster the data at 444 based on the configuration of the ML model 446.

Once the simulated data is clustered based on the model configuration, the data poisoning and model drift prevention computing system 104 analyzes the clustered simulated data set to determine clustering characteristics of the simulated data set. Because the simulated data set comprises data that has been generated based on known trusted data and has been validated to meet characteristics defined for capture of real data, the clustering characteristics can be used to generate acceptance criteria at 450. The acceptance criteria may include one or more of a number of clusters, a cluster density characteristic, a nearness criteria (e.g., vicinity characteristic) that defines spacing and/or other "nearness" characteristics of the data clusters and/or the like. In some cases, the acceptance characteristics may be integer-based, or range based criteria. Once generated, the acceptance criteria generated at 450 may be as thresholds in the analysis performed at 422, 424, and 426. Additionally, the data poisoning and model drift prevention computing system 104 may use the acceptance characteristics, such as a trending of movement in the acceptance characteristics over time, when identifying negative model drift and during the associated boundary analysis computations.

Figure 5:
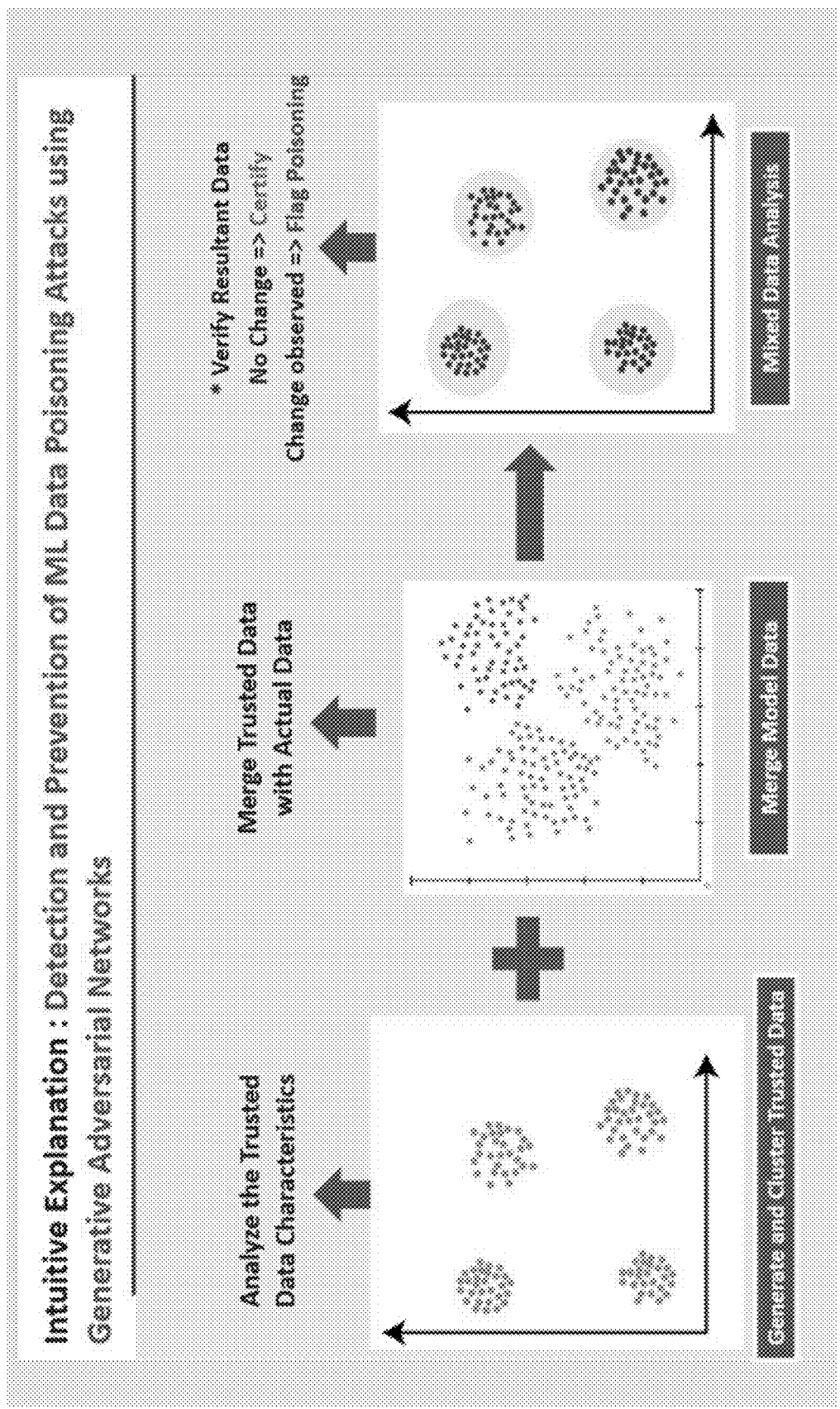
FIG. 5 shows an illustrative example of data merging and clustering in accordance with one or more aspects described herein.
Figure 6:
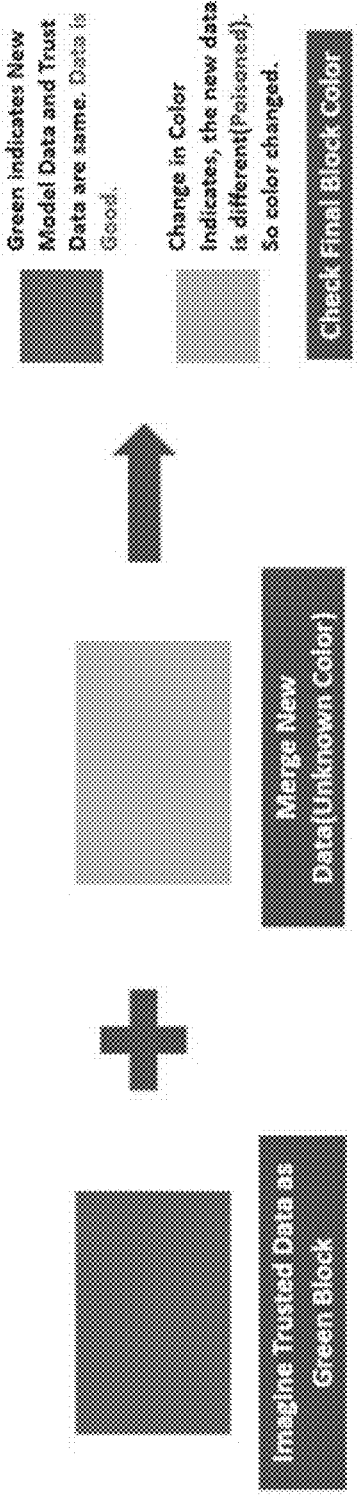
FIG. 6 shows an illustrative example of data qualification in accordance with one or more aspects described herein.

FIG. 5 shows an illustrative example of data merging and clustering in accordance with one or more aspects described herein. For example, the charts show generation and clustering of trusted data, and merging the trusted data with actual data, where the resultant data set is analyzed to determine whether the resultant clusters meet the boundary conditions, as shown in the mixed data analysis chart. Here, the boundary conditions may be shown as a range (e.g., a shaded area) in which clustering of data is expected to be seen. FIG. 6 shows another illustrative example of data qualification in accordance with one or more aspects described herein. FIG. 7 shows an illustrative example identifying model drift, in accordance with one or more aspects described herein. Here, the chart 730 contains trusted data showing scores associated with students for different classes, their marks, and a result associated with each mark. Chart 750 shows data identifying data poisoning and model drift, where an individual's marks may be flagged if they do not meet a certain boundary condition (e.g., between 0 and 100). Here, student S002's marks in chemistry are greater than 100 and Student S001's marks in physics is less than 0, both outside the allowable boundary condition. Here, the data poisoning and model drift prevention computing system 104 would issue an alert including an indication that the data poisoning may be occurring and trigger a remedial action.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   a first computing device comprising a machine learning (ML) engine processing a data set using an ML model; and
   a second computing device comprising:
   a processor; and
   non-transitory memory storing instructions that, when executed by the processor, cause the second computing device to:
   perform stratified sampling of a trusted data set;
   generate simulated data set from sampled data from the trusted data set;
   validate the simulated data set to generate a validated data set;
   receive, form the first computing device, a first data set comprising data analyzed by the ML model based on a model configuration;
   merging, the first data set with the validated data set to form a merged data set;
   cluster the merged data set;
   identify, based on a comparison of first data clusters of the merged data set to acceptance criteria, changes in one or more clustering characteristics; and
   trigger, based on a boundary analysis of the clustered merged data set, the first computing device to perform a remedial action associated with the ML model.

2. The system of claim 1, wherein the first data set comprises a data stream.

3. The system of claim 2, wherein the data stream is received continuously in real time.

4. The system of claim 1, wherein the first data set comprises batch data.

5. The system of claim 1, wherein the simulated data set is generated by a generative model.

6. The system of claim 1, wherein the clustering characteristics comprise one or more of a number of data clusters, a cluster density, and a cluster vicinity characteristic.

7. The system of claim 1, wherein the instructions further cause the second computing device to generate the acceptance criteria based on an analysis of the simulated data set based on the model configuration.

8. The system of claim 1, wherein the instructions further cause the second computing device to regenerate the simulated data set based on identification of invalid data.

9. The system of claim 1, wherein the remedial action comprises reverting to a previous trusted model.

10. An apparatus comprising:
    a processor; and
    non-transitory memory storing instructions that, when executed by the processor, cause the apparatus to:
    perform stratified sampling of a trusted data set;
    generate simulated data set from sampled data from the trusted data set;
    validate the simulated data set to generate a validated data set;
    receive, form a first computing device, a first data set comprising data analyzed by a ML model based on a model configuration;
    merging, the first data set with the validated data set to form a merged data set;
    cluster the merged data set;
    identify, based on a comparison of first data clusters of the merged data set to acceptance criteria, changes in one or more clustering characteristics; and
    trigger, based on a boundary analysis of the clustered merged data set, the first computing device to perform a remedial action associated with the ML model.

11. The apparatus of claim 10, wherein the first data set comprises a data stream.

12. The apparatus of claim 11, wherein the data stream is received continuously in real time.

13. The apparatus of claim 10, wherein the first data set comprises batch data.

14. The apparatus of claim 10, wherein the simulated data set is generated by a generative model.

15. The apparatus of claim 10, wherein the clustering characteristics comprise one or more of a number of data clusters, a cluster density, and a cluster vicinity characteristic.

16. The apparatus of claim 10, wherein the instructions further cause the apparatus to generate the acceptance criteria based on an analysis of the simulated data set based on the model configuration.

17. The apparatus of claim 16, wherein the instructions further cause the apparatus to regenerate the simulated data set based on identification of invalid data.

18. The apparatus of claim 10, wherein the remedial action comprises reverting to a previous trusted model.

* * * * *